United States Patent
Marier et al.

(10) Patent No.: US 9,605,647 B2
(45) Date of Patent: Mar. 28, 2017

(54) COMPACT BLADE FOR RUNNER OF FRANCIS TURBINE AND METHOD FOR CONFIGURING RUNNER

(71) Applicant: ANDRITZ HYDRO LTD., Point-Claire (CA)

(72) Inventors: Sylvain Marier, Boisbriand (CA); Eric Theroux, Les Cedres (CA)

(73) Assignee: Andritz Hydro Ltd., Pointe-Claire (CA)

( * ) Notice: Subject to any disclaimer, the term of this patent is extended or adjusted under 35 U.S.C. 154(b) by 414 days.

(21) Appl. No.: 14/353,670

(22) PCT Filed: Oct. 23, 2012

(86) PCT No.: PCT/CA2012/050755
§ 371 (c)(1),
(2) Date: Apr. 23, 2014

(87) PCT Pub. No.: WO2013/059935
PCT Pub. Date: May 2, 2013

(65) Prior Publication Data
US 2014/0294590 A1    Oct. 2, 2014

Related U.S. Application Data

(60) Provisional application No. 61/550,432, filed on Oct. 23, 2011.

(51) Int. Cl.
*B63H 1/16*    (2006.01)
*F03B 3/12*    (2006.01)
*F03B 3/02*    (2006.01)

(52) U.S. Cl.
CPC ........... *F03B 3/125* (2013.01); *F03B 3/02* (2013.01); *F03B 3/121* (2013.01); *Y02E 10/223* (2013.01); *Y10T 29/4973* (2015.01)

(58) Field of Classification Search
CPC ............................ F04D 29/284; F04D 29/30
USPC ............................ 416/182–186 A; 415/206
See application file for complete search history.

(56) References Cited

U.S. PATENT DOCUMENTS 5,249,922 A * 10/1993 Sato .................. F01D 5/142
                                                        415/191
6,135,716 A    10/2000 Billdal et al.
7,128,534 B2   10/2006 Enomoto et al.
7,195,459 B2   3/2007 Enomoto et al.
(Continued)

FOREIGN PATENT DOCUMENTS

| CA | 2 438 429 | 2/2005 |
|----|-----------|--------|
| EP | 1048850   | 11/2000 |

(Continued)

OTHER PUBLICATIONS

Japanese Office Action cited in JP 2014-536081 mailed Jun. 28, 2016 with English Translation, ten pages.
(Continued)

*Primary Examiner* — R. K. Arundale
(74) *Attorney, Agent, or Firm* — Nixon & Vanderhye P.C.

(57) ABSTRACT

A blade for a runner of a Francis turbine having a throat diameter (Dth), the blade including: a maximum thickness of no less than 0.03 Dth and a leading edge having a maximum lean angle of no less than 45 degrees, wherein the lean angle is defined by a vertical line and the leading edge.

12 Claims, 4 Drawing Sheets

(56) References Cited

U.S. PATENT DOCUMENTS

| | | | |
|---|---|---|---|
| 7,195,460 B2 | 3/2007 | Bazin et al. | |
| 7,198,470 B2 | 4/2007 | Enomoto et al. | |
| 7,500,830 B2 * | 3/2009 | Graham | B02C 19/06 416/186 R |
| 8,608,445 B2 * | 12/2013 | Burgess | F04D 29/167 416/186 R |
| 2005/0013691 A1 | 1/2005 | Enomoto et al. | |
| 2006/0051210 A1 | 3/2006 | Bazin et al. | |
| 2015/0159670 A1 * | 6/2015 | Saito | F04D 29/30 415/206 |

FOREIGN PATENT DOCUMENTS

| | | |
|---|---|---|
| EP | 1 662 136 A2 | 5/2006 |
| JP | 60-171966 | 11/1985 |
| JP | 10-318117 | 12/1998 |
| JP | 2006-291865 | 10/2006 |
| WO | 98/05863 | 2/1998 |
| WO | 2004031574 A1 | 4/2004 |
| WO | 2011071420 A1 | 6/2011 |

OTHER PUBLICATIONS

Suthep Kaewnai et al., Improvement of the Runner Design of Francis Turbine Using Computational Fluid Dynamics, American J. of Engineering and Applied Sciences 4 (4): 540-547, 2011.

* cited by examiner

COMPACT BLADE FOR RUNNER OF FRANCIS TURBINE AND METHOD FOR CONFIGURING RUNNER

CROSS RELATED APPLICATION

This application is the U.S. national phase of International Application No. PCT/CA2012/050755 filed 23 Oct. 2012 which designated the U.S. and claims priority to U.S. Provisional Patent Application No. 61/550,432 filed 23 Oct. 2011, the entire contents of these applications are incorporated by reference.

BACKGROUND OF THE INVENTION

The invention relates to a blade shape for a Francis hydraulic turbine and particularly to the inlet angle and thickness of the blade.

The Francis turbine is a commonly used water turbine. Francis turbines are suitable for operation with pressure heads of, for example, ten (10) meters to six hundred and fifty (650) meters. These turbines are often used to drive generators to produce electrical power, such as in the range of 10 to 750 megawatts. Examples of Francis turbines are shown in U.S. Pat. Nos. 7,198,470; 7,195,460; 7,195,459; 7,128,534 and 6,135,716. The reference diameter of a Francis turbine, e.g., the runner diameter, may be 1 to 10 meters. The turbine may operate at rotational speeds of 80 to 1000 revolutions per minute (rpm). Large and mid-sized Francis turbines tend to rotate about a vertical shaft, whereas smaller turbines rotate about a horizontal shaft. This general description of a conventional Francis turbine is to provide a context for the blade shape disclosure herein and not to limit the scope of the invention.

A runner is the portion of a Francis turbine which includes the turbine blades. A new runner may be installed when rehabilitating a Francis turbine. The dimensions of the new runner are constrained by the dimensions of the chamber for the existing runner. The new runner is designed to fit into the housing. Due to the constraints of the existing housing, the design of the new runner may not be optimal to provide maximum peak efficiency and cavitation behavior for the turbine. Generally, the new runner is constrained to be more compact, e.g., have a smaller runner inlet diameter, than would be the optimal. Because the runner is compact, issues arise with respect to the efficiency of the turbine and its performance such as with respect to cavitation. These issues tend to be of a particular concern where the runner is to be used in a Francis turbine operating under a large pressure head, such as greater than 100 meters.

For a given pressure head, number of blades and fixed blade outlet elevation relative to distributor centerline, compact inlet diameters should increase the global blade loading. The blade inlet can therefore reach critical low pressure levels, resulting in either pressure or suction side cavitation, depending on operating head.

BRIEF DESCRIPTION OF THE INVENTION

A novel Francis turbine has been conceived having a novel blade shape. The novel blade is suitable, for example, for a compact runner which may be used to replace an existing runner. The compact runner may be designed to fit in an existing housing and thus constrained to have compact blades.

The compact blades may have a unique inlet shape which has improved performance with respect to cavitation issues and turbine efficiency. For example, the lean of the blade inlet may be pronounced, e.g., greater than 45 degrees. The blade may have a fixed blade outlet elevation relative to a distributor centerline and a given inlet diameter. The pronounced lean angle assists in controlling suction side cavitation, especially at the maximum rate head for the turbine. The pronounced leaning of the blade inlet may be from the shroud to mid-blade, relative to hub. The pronounced leaning of the inlet blade tends to suppress cavitation that might otherwise damage the surface of the inlet area of the blade.

The blade may be relatively thin, as compared to a conventional blade of a runner in a Francis turbine. The blade may be relatively thin at the inlet region of the blade. The blade may be relatively thin along the center height of the inlet to the runner.

A blade has been conceived for a runner of a Francis turbine having a maximum thickness of no less than 0.03 Dth and a maximum lean angle no less than 45 degrees allows the blade and runner to be compact. A compact runner may be used to rehabilitate an existing Francis turbine assembly by replacing an outdated runner with a runner having high performance blades that efficiently convert water energy to mechanical power and suppress cavitation on the surfaces of the blades.

A blade has been conceived for a runner of a Francis turbine having a throat diameter (Dth), the blade comprising: a maximum thickness of no less than 0.03 Dth and a leading edge having a maximum lean angle of no less than 45 degrees, wherein the lean angle is defined by a vertical line and the leading edge. The blade may be relatively short as compared to a standard sized blade for a runner of a Francis turbine. The leading edge of the blade may be parallel to a vertical axis and the runner rotates about the vertical axis. The trailing edge of the blade may face in a generally downward direction.

The blade may be arranged in an annular array of blades mounted in the runner, wherein an upper edge of each blade is fixed to an inverted conical portion of a hub or crown of the runner. Each blade may have a lower side edge fixed to the runner band.

A method has been conceived to replace a runner in a Francis turbine comprising: removing an existing runner from a chamber for the Francis turbine, and installing another runner into the chamber, wherein the runner has a throat diameter (Dth) and an array of blades, wherein each blade includes a maximum thickness of no less than 0.02 Dth and a leading edge having a maximum lean angle of no less than 45 degrees, wherein the lean angle is defined by a vertical line and the leading edge. The method may avoid expanding an internal diameter of the chamber, and substantially altering the chamber to install the other runner.

DETAILED DESCRIPTION OF THE INVENTION

Figure 1:
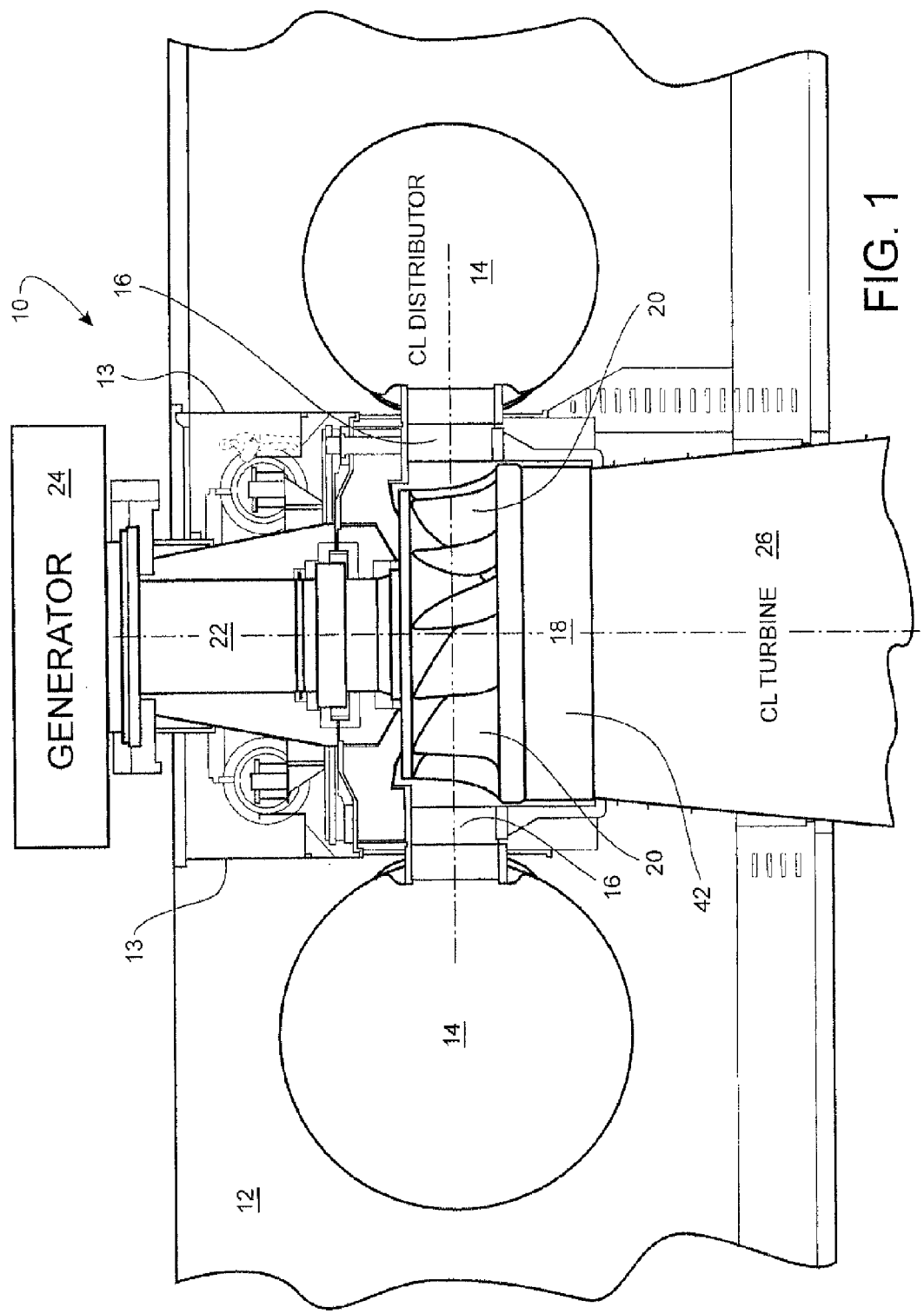
FIG. 1 is a schematic diagram showing a side view of a Francis hydro turbine assembly.

FIG. 1 is a side view of a conventional Francis hydro turbine assembly 10. The assembly may be mounted within a dam 12, such as 10 to 650 meters below the surface of the water source behind the dam. An annular housing 13 formed within the wall of the dam. The housing may include a chamber within the dam and mounting brackets to receive and support turbine assembly.

Water passages extend through the dam to a spiral water passage 14 that encircles the turbine assembly. Water from the spiral flows radially inward into an annular distributor 16 and then a runner 18. The runner includes an array of blades 20. Water flowing over the blades drives and rotates the runner. The runner drives a vertical shaft 22 that is coupled to an electrical power generator 24. Water from the runner may flow downward through an outlet passage 26 that discharges the water from below the turbine assembly and downstream of the dam.

The distributor 16 may include one or a plurality of annular arrays of guide vanes. At least one of the annular arrays may be adjustable guide vanes, wherein the angle of the guide vanes with respect to the water flow may be changed. Typically, the adjustable guide vanes will be the innermost array and immediately upstream of the runner.

A vertically oriented Francis hydro turbine may have a vertical centerline (CL turbine) aligned with the shaft 26, and a horizontal centerline (CL distributor) aligned with the distributor. If the Francis hydro turbine is horizontally oriented, the centerline aligned with the shaft will be horizontal and the centerline aligned with the distributor may be vertical.

Figure 2:
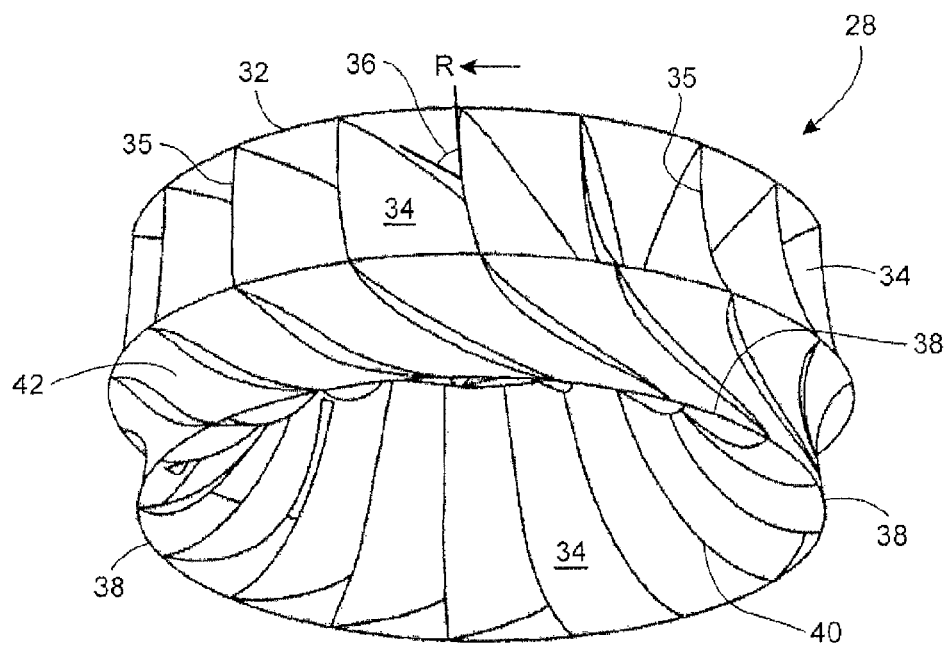
FIGS. 2 and 3 are perspective views of conventional runners for Francis turbines.
Figure 3:
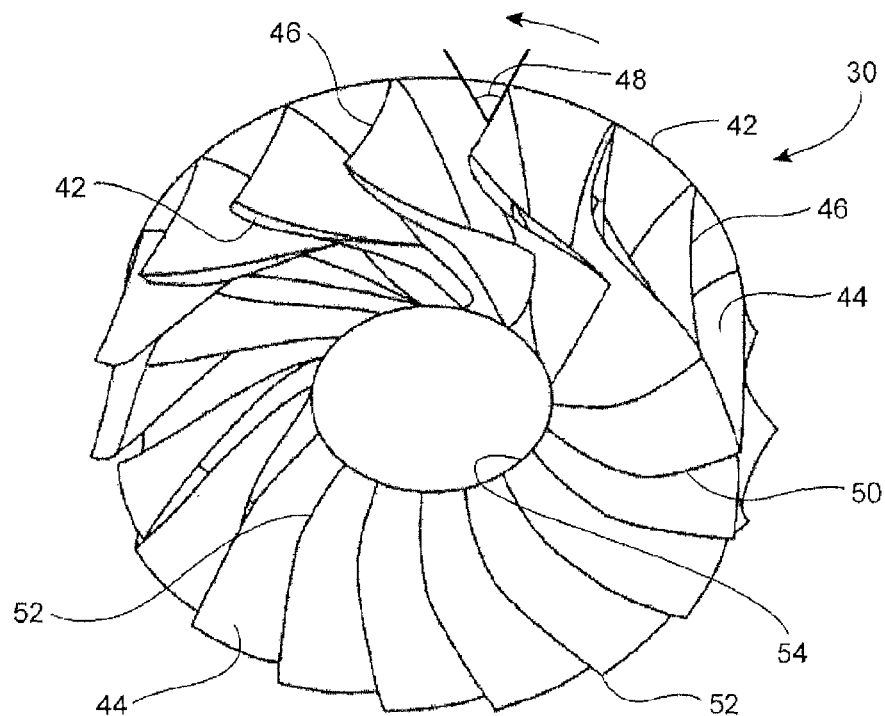

FIGS. 2 and 3 illustrate conventional runners 28 and 30 that are also shown in U.S. Pat. No. 6,135,716. The runner 28 shown in FIG. 2 includes a hub or crown 32 that may be circular in cross section and has an inverted conical surface facing the upper edges of the turbine blades 34. The conical surface forms an upper support surface for the turbine blades 34. The leading edges 35 of the blades may be aligned with the radially outer periphery of the runner and each blade may be generally parallel with the shaft centerline of the turbine. The leading edges 35 of the blades 34 may be oriented to have an inlet angle 36 with respect to the direction of rotation (R) of the runner and with respect to a horizontal plane. The lower portion of the runner may be defined by a ring 38 which extends around the periphery of the outlet edges 10 of the blades.

A frustoconical section of the runner 42 may include a band (see FIG. 1) that surrounds a portion of the outer edges of the blades. The frustoconical section may be between the ring 38 and the lower corner of the leading edges 38 of the blade.

The runner 30 shown in FIG. 3 also has a hub or crown 42 that supports an annular array of blades 44. The runner shown in FIG. 3 is different from the runner 28 shown in FIG. 2 and is shown from a more bottom-up view than shown in FIG. 2.

The leading edges 46 of the blades 44 of the runner 30 may have an inlet angle 48 which is at an opposite direction than the angle 36 of the runner 28. The trailing edge 50 of the blade may have a curvature extending from the radially outward tip 52, and in radially inward and upward directions to a radially inward perimeter 54 of the blades.

The runner of a Francis turbine may be designed to be seated in an existing annular housing in a powerhouse. The chamber for the runner provided by the housing may be smaller, e.g., smaller diameter, than may be warranted for a modern runner having highly efficient blades. It may not be practical to expand the chamber to accommodate a larger, e.g., wider diameter, runner.

Figure 4:
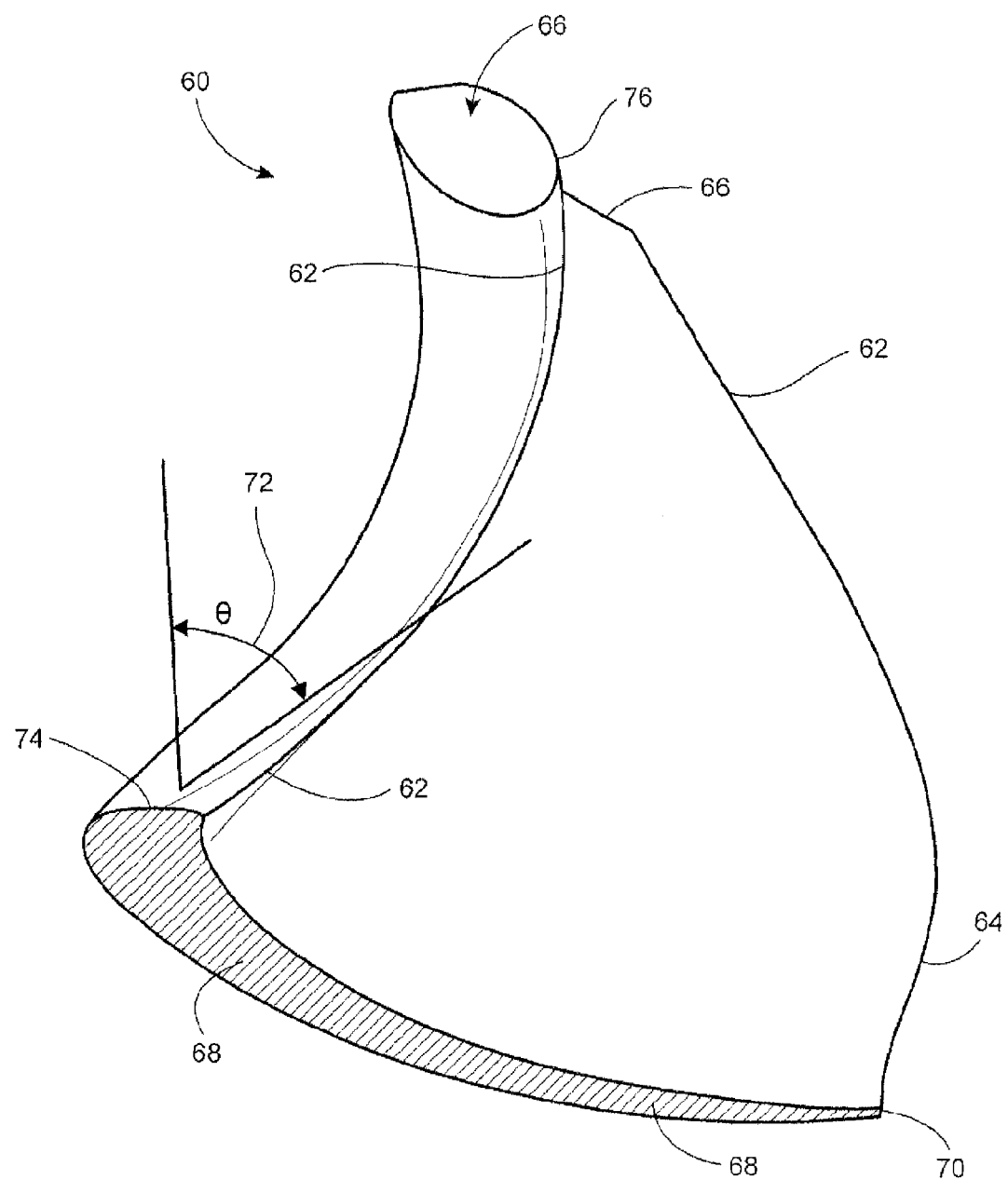
FIG. 4 is a perspective view of blade of a runner for a Francis turbine.

FIG. 4 is a perspective view of a compact blade 60 for a relatively small runner. The compact blade is suited for a compact runner designed to be seated in a relatively small chamber in a powerhouse. The compact blade 60 has a leading edge 62 and a trailing edge 64. An upper edge 66 of the blade may join the lower surface of a crown or hub of the runner. A side edge 68 of the blade may join a frustoconical inner surface of the runner band. An annular array of the blades 60 are arranged in the runner such that the hub or crown is at the upper ends of the blades. The band extends around a lower side region of the blades and the lower ring of the runner may be defined by the lower corner 70 of each of the blades.

The leading edge 62 may be oriented to be generally parallel to an axis of the shaft of the runner. The leading edge may have a generally large curvature with respect to a vertical direction, as shown in FIG. 4. The leading edge may form a lean angle (θ) 72 which is relatively large, such as equal to or greater than 45 degrees (45°). As shown in FIG. 4, the lean angle 72 at the lower edge 74 of the leading edge 62. At the upper edge 76 of the leading edge 62, the lean angle may be relatively small such as below ten degrees or zero degrees. The extreme leaning of the blade allows the blade to be compact, e.g., and be shorter than would occur without the extreme lean.

Figure 5:
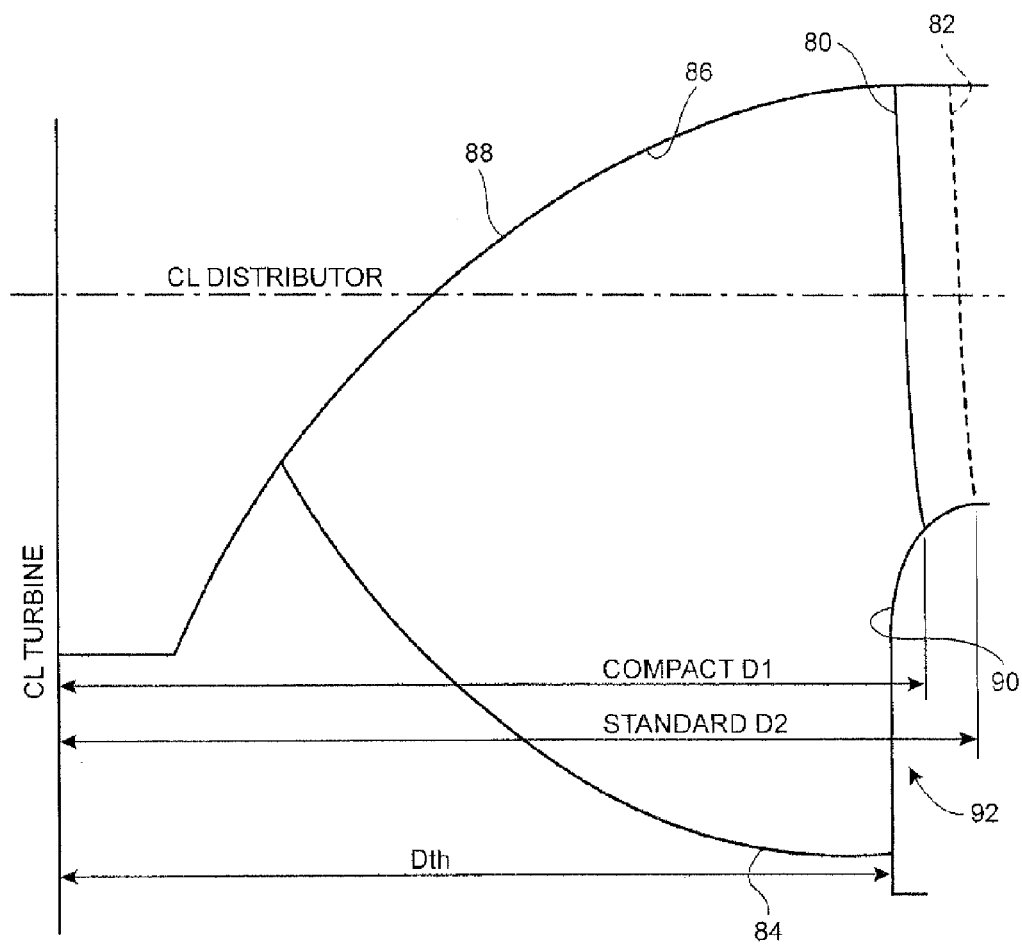
FIG. 5 is a chart of outlines of blades comparing a conventional blade to a compact blade.

FIG. 5 is a chart comparing the leading edge 80 of a compact blade to the leading edge 82 of a non-compact blade. The leading edge 82 of the non-compact blade extends radially outward further than the leading edge 80 of the compact blade. Accordingly, the diameter (D1) of the runner with the compact blade is narrower than the diameter (D2). Both blades have similar profiles for their trailing edges 84, upper edges 86 that join to the inverted conical surface 88 of the crown or hub, and a side edge 90 that joins to the inside surface 92 of the runner band. The throat diameter (Dth) may be the diameter of the inner surface 92 of the band and typically defines the narrowest water passage through the runner. FIG. 5 also illustrates the orientation of the blades with respect to the horizontal distributor centerline (CL Distributor) and the vertical centerline of the rotational axis of the runner (CL turbine).

Figure 6:
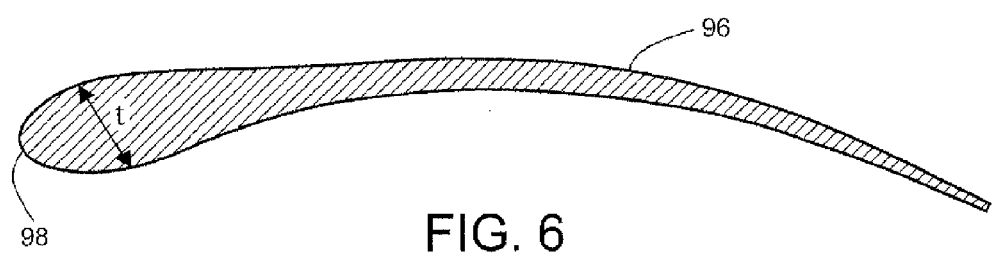
FIG. 6 shows an exemplary cross section of a compact blade.

FIG. 6 is a schematic diagram of a compact blade 96 shown in cross section. The blade may have the same shape and dimension as the blade shown in FIG. 4. The thickness (t) of the blade near the leading edge 98 is relatively small, as compared to conventional blades for runners of Francis turbines. The thickness (t) is the thickest portion of the blade. The thickness of the blade may be equal to or less than three percent (3%) of the throat diameter (0.03 Dth).

A blade for a runner of a Francis turbine having a maximum thickness of no less than 0.03 Dth and a maximum lean angle no less than 45 degrees allows the blade and runner to be compact. A compact runner may be used to rehabilitate an existing Francis turbine assembly by replacing an outdated runner with a runner having high performance blades that efficiently convert water energy to mechanical power and suppress cavitation on the surfaces of the blades.

A method to replace a runner in a Francis turbine has been conceived comprising: removing an existing runner from a chamber for the Francis turbine, and installing another runner into the chamber, wherein the runner has a throat diameter (Dth) and an array of blades, wherein each blade includes a maximum thickness of no less than 0.03 Dth and a leading edge having a maximum lean angle of no less than 45 degrees, wherein the lean angle is defined by a vertical line and the leading edge. The method may be performed without expanding an internal diameter of substantially altering the chamber to accommodate the another runner.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A blade for a runner of a Francis turbine having a throat diameter (Dth), the blade comprising:
a maximum blade thickness of no less than 0.03 Dth and a leading edge having a maximum lean angle of no less than 45 degrees, wherein the lean angle is defined by a vertical line and the leading edge.

2. The blade of claim 1 wherein the leading edge of the blade has a vertical orientation.

3. The blade of claim 1 wherein the runner rotates about a vertical axis.

4. The blade of claim 1 further comprising a trailing edge facing in a generally downward direction.

5. The blade of claim 1 wherein the blade is arranged in an annular array of blades mounted in the runner, wherein an upper edge of each blade is fixed to an inverted conical portion of a hub or crown of the runner.

6. The blade of claim 5 wherein each blade has a lower side edge fixed to a runner band.

7. A method to replace a runner in a Francis turbine comprising:
removing an existing runner from a chamber for the Francis turbine, and
installing another runner into the chamber, wherein the another runner has a throat diameter (Dth) and an array of blades, wherein each blade includes a maximum thickness of no less than 0.03 Dth and a leading edge having a maximum lean angle of no less than 45 degrees, wherein the lean angle is defined by a vertical line and the leading edge.

8. The method of claim 7 further including avoiding expanding an internal diameter of the chamber during the removing and installing steps.

9. The method of claim 7 wherein the dimensions of the chamber are not substantially altered to remove the existing runner or to install the another runner.

10. A Francis turbine runner comprising:
a crown having a vertical axis, an outer surface which is circular in cross section and tapers in a downward direction;
an annular band concentric with the crown and at least a portion of the band is at an elevation below a lowermost region of the crown, and
an annular array of blades between the crown and band, wherein each blade has a first edge joined to the outer surface of the crown, a second edge joined to an inner surface of the annular band, a leading edge extending between an upper corner of the first edge and an upper corner of the second edge, and a trailing edge extending between a lower corner of the first edge and a lower corner of the second edge,
wherein the leading edge forms an angle with a vertical line and the maximum dimension of the angle is at least 45 degrees, and the leading edge is oriented vertically.

11. The Francis turbine runner of claim 10 wherein each blade has a maximum thickness of no less than 0.03 Dth, wherein Dth is a throat diameter of the turbine.

12. The Francis turbine runner of claim 10 wherein the leading edge forms an inlet angle with respect to a radial line, wherein the inlet angle extends from the radial line to the leading edge in a direction opposite to a rotational direction of the runner.

* * * * *